US008862132B2

(12) United States Patent
Arauzo et al.

(10) Patent No.: US 8,862,132 B2
(45) Date of Patent: Oct. 14, 2014

(54) PROVIDING LOCAL TRAFFIC IN A CELL OR GROUP OF CELLS OF A CELLULAR COMMUNICATION NETWORK

(75) Inventors: Miguel Arranz Arauzo, Madrid (ES); David Valerdi Rodriguez, Madrid (ES); Iñigo Güemes Cabrejas, Madrid (ES)

(73) Assignee: Vodafone IP Licensing Limited, Newbury, Berkshire (GB)

( * ) Notice: Subject to any disclaimer, the term of this patent is extended or adjusted under 35 U.S.C. 154(b) by 390 days.

(21) Appl. No.: 13/283,505

(22) Filed: Oct. 27, 2011

(65) Prior Publication Data

US 2012/0108229 A1    May 3, 2012

(30) Foreign Application Priority Data

Oct. 27, 2010  (ES) .................................. 201031576
Mar. 7, 2011   (GB) .................................. 1103749.6

(51) Int. Cl.
| | |
|---|---|
| *H04W 36/00* | (2009.01) |
| *H04W 4/24*  | (2009.01) |
| *H04W 76/04* | (2009.01) |
| *H04W 88/04* | (2009.01) |
| *H04W 76/02* | (2009.01) |
| *H04W 88/14* | (2009.01) |
| *H04W 4/08*  | (2009.01) |
| *H04W 24/04* | (2009.01) |
| *H04W 92/18* | (2009.01) |

(52) U.S. Cl.
CPC ............ *H04W 76/041* (2013.01); *H04W 88/04* (2013.01); *H04W 4/24* (2013.01); *H04W 76/023* (2013.01); *H04W 88/14* (2013.01); *H04W 4/08* (2013.01); *H04W 24/04* (2013.01); *H04W 92/18* (2013.01)
USPC ......................... 455/438; 455/411; 455/422.1

(58) Field of Classification Search
CPC ....................................................... H04W 84/14
USPC ......................................... 455/422.1, 411, 438
See application file for complete search history.

(56) References Cited

U.S. PATENT DOCUMENTS

| | | |
|---|---|---|
| 6,996,630 B1 | 2/2006 | Masaki et al. |
| 7,643,458 B1 | 1/2010 | Talwar et al. |

(Continued)

FOREIGN PATENT DOCUMENTS

| | | |
|---|---|---|
| EP | 2207399 | 7/2010 |
| WO | 2006/032003 A2 | 3/2006 |

(Continued)

OTHER PUBLICATIONS

P100864-EP-EPA European Search Report dated Mar. 14, 2012 in connection with European Patent Application No. 11275131.8-1525.

(Continued)

*Primary Examiner* — Amancio Gonzalez
(74) *Attorney, Agent, or Firm* — Workman Nydegger

(57) ABSTRACT

A network component for a cellular network. The cellular network includes a plurality of access nodes covering a cell area and an access control node common to all access nodes for controlling the provision of traffic. The network component includes a communication manager and a classifier for classifying users of the cellular network into a first group of users and a second group of users. The communication managers checks if a call or an SMS is set up by a user belonging to the first or second group of users, takes control over calls and/or SMSs set up between users of the first group of users, and passes control to the access control node of the remaining calls and/or SMSs.

15 Claims, 4 Drawing Sheets

(56) References Cited

U.S. PATENT DOCUMENTS

| | | | |
|---|---|---|---|
| 8,169,892 B2* | 5/2012 | Malkamaki et al. | 370/216 |
| 2006/0251008 A1 | 11/2006 | Wu et al. | |
| 2010/0020779 A1 | 1/2010 | Kalhan et al. | |
| 2012/0135713 A1* | 5/2012 | Lee et al. | 455/411 |
| 2013/0122911 A1* | 5/2013 | Zdarsky et al. | 455/438 |

FOREIGN PATENT DOCUMENTS

| | | |
|---|---|---|
| WO | 2006126923 | 11/2006 |
| WO | WO 2007/032713 | 3/2007 |
| WO | WO 2009/107144 | 9/2009 |
| WO | 2009/135981 A1 | 11/2009 |

OTHER PUBLICATIONS

Search Report in corresponding ES Application No. P201031576 dated Jul. 18, 2012.

Search Report in corresponding GB Application No. GB1103749.6 dated Jun. 28, 2011.

* cited by examiner

PROVIDING LOCAL TRAFFIC IN A CELL OR GROUP OF CELLS OF A CELLULAR COMMUNICATION NETWORK

CROSS REFERENCE TO RELATED APPLICATIONS

This Application claims priority to and the benefit of Spanish Application No. ES P201031576, filed Oct. 27, 2010, and this application claims priority to and the benefit of United Kingdom Application No. GB 1103749.6, filed Mar. 7, 2011, the disclosures of which are hereby incorporated by reference in their entireties.

BACKGROUND OF THE INVENTION

1. Technical Field

The present invention relates to cellular telecommunications networks and in particular, to cellular telecommunications networks in which local traffic (calls and/or messages) may be provided between users in a cell area or group of cell areas.

2. Description of Related Art

Cellular network operators are deploying their networks across more and more remote areas. Consequently, instability on transmission links, which are part of the radio access network, i.e. the Base Station System (BSS) in case of 2G networks or the RAN in case of 3G networks, is becoming a common problem. In emerging markets, this instability is typically due to the more challenging requirements placed on network links, such as those arising from distance, terrain, improper maintenance, bad quality transport networks, etc. Due to this instability, users suffer from frequent service outages. This undermines customers' confidence in the service and it has an economical impact, both for users and operators. So, it would be desirable to provide a solution which is able to alleviate transmission problems and provides service with an acceptable level of quality in remote areas.

There have been several attempts at minimizing used transmission bandwidth in the cellular communication network for isolated/rural coverage and in order to address the impact of transmission link instability. Two broad approaches can be distinguished.

The first approach, which is referred to as "Local Switching" is a radio network functionally that allows switching user plane traffic information flow through the access node (BTS) when a call is established between parties camped in the same BTS coverage (refer to 3GPP work item CP-090812, Release #10). Control plane information (i.e. signalling) is still conducted towards other access nodes: BSC and Core. Thanks to this functionally some savings in transmission bandwidth links are obtained. An example of how this local switching works is depicted in FIG. 1: a 2G cellular communication network 10 comprises access nodes 20 (BTSs), radio control nodes 30 (BSCs) and a Core Network 40. Voice calls 60 between mobile users 50 in the same cell area covered by one of the access nodes or in the cell areas of a cluster of access nodes, are switched locally. However, the signalling 70 proceeds up to the core network 40.

This results of course in a considerable reduction of the used transmission bandwidth in the radio access network, because the forward and backward voice transmission connection from the access node 20 to the core network 40 can be dispensed with. Furthermore, this solution has no impact on VAS (value added services) provided by the cellular communication network. They can be provided in a conventional manner by the core network, because the signalling messages from and to the mobile station involved in the intra BTS voice call are at its disposal. Finally, there is no need for a fundamental architecture change of the cellular network.

However, a transmission link failure in the access network results in a complete service outage because the signalling can no longer reach the core network. Furthermore, local business models, wherein the billing and call provisioning of the users 50 are managed locally, are not possible.

The second approach, which is referred to as "Network in a Box", provides a local system which is designed to provide emergency or temporary network to provide coverage after a disaster. This solution includes a functional pre-configured core network that offers routing, authentication and radio access network management. Node B options and expansion kits allow customers to create a custom network that meets their needs.

FIG. 2 schematically illustrates certain features of an implementation of this second approach. In this case, the radio control node functionality 30' and core network functionality 40' are collapsed for an access node 20 or cluster of access nodes. Voice calls 60 between local mobile users 50 in the same cell area covered by one of the access nodes or in the cell areas of a cluster of access nodes, are switched and controlled locally, by means of a local network 80 covering the cell areas of the access node 20 or cluster of access nodes. Local users are manually provisioned in the local network 80.

In this second approach there is no integration with any operator network whatsoever, since this system provides a solution designed to provide a emergency or temporary network. In fact, only users provisioned in the system can make calls.

SUMMARY OF THE INVENTION

It is an object of the invention to provide a network component and a method for locally emulating a core network for use in a cellular communication network by which the above mentioned problems are at least partially solved.

Thereto, according to the invention a network component and a method according to the independent claims are provided. Favourable embodiments are defined in the dependent claims.

The invention provides a laptop or computer software which locally emulates the functionality of MSC/Radio controller, connected to a BTS. It is also possible that the software is integral with the BTS.

According to an aspect of the invention there is provided a network component of a cellular network, the cellular network comprising:
 a plurality of access nodes each covering a cell area;
 an access control node common to all access nodes for controlling the provision of traffic;
wherein the network component comprises:
 a classifier for classifying users of the cellular network into a first group of users and a second group of users, wherein said first group of users include users in a cell area or areas covered by a single access node or group of access nodes; and.
 a communication manager for:
   checking if a call or SMS is set up by a user belonging to the first or to the second group of users;
   taking control over calls and/or SMSs set up between users belonging to the first group of users;
   passing control to the access control node of the remaining calls and/or SMSs,
the network component being arranged in communication with said single access node or group of access nodes.

So, according to the invention the users are divided into a first group of users (local users), for whom the provision of traffic communication is locally controlled by means of the network component provided by the invention, and a second group of users (public users) for whom the provision of traffic communication is centrally controlled by a central functionality, including an access control node and a core network. As a result thereof, users of the second group—public users—are not handled as roamers when they are in the cell area or areas covered by the single access node or group of access nodes, which area is referred to in the present disclosure as local coverage area. Furthermore, since the call provisioning for user of the second group of users—public users—is controlled centrally in the cellular communication network there is no VAS service restriction for public users. User belonging to the first group of users—local users—can also benefit from VAS services provided by the cellular communication network.

The network component according to the invention can also communicate and synchronize with the core network of the public cellular communication network, so whenever the link between the network entity and the public cellular network is available and operative, local users can also benefit from VAS. Finally, local traffic does not require a transmission link to a radio control node or core network of the cellular communication network, so any transmission link failures do not affect the local traffic.

Preferably the network component further includes monitoring means for detecting an outage in a link between at least one of the access nodes and the access control node, in which case the communication manager is further configured for still enabling traffic between all users located in that cell area or areas covered by the single access node or group of access nodes, regardless if they are local users belonging to the first or the second group of users. Consequently, service in the local area is not interrupted in case of a link outage on the link to the public cellular network.

According to an embodiment of the invention, the network component is implemented as a conventional computer on which a computer program is running, the computer being locally arranged to the access node or group of access nodes. In this way, it augments but does not replace existing hardware (BTS/node-B and BSC/RNC) and software. No new elements or modifications of the network architecture are needed apart from a conventional computer (e.g. a laptop) and the corresponding software package.

Preferably, the network component is configured for billing users of the first group of users—local users—and the central functionality is configured for billing users of the second group of users—public users—. In this way, local business models become possible, wherein a local network operator offers communication services to local users in the coverage area of a single access node or a cluster of access nodes.

According to a further embodiment of the invention, the functionality implemented by the network component is transparent for public users. In this way, the service to the public users in the local coverage area is not different from the service in other coverage areas of the cellular communication network and the public users will not notice any difference.

According to a still further embodiment of the invention, a user of the first group of users—a local user—becomes a user of the second group of users—public user—outside the cell area of their access node or group of access nodes. In this way, the local users are provided with non-roaming communication services in the coverage area of the whole cellular communication network and not only in the local area.

The central functionality may be implemented by a conventional access control node (BSC/RNC) and core network of the cellular communication network (MSC).

According to a yet further embodiment of the invention, the traffic between public users in the cell area or areas covered by a single access node or group of access nodes is switched locally. As a consequence only the signalling of the public users in the local coverage area is transmitted to the central functionality of the cellular communication network and not the traffic. This results in a further reduction in the use of transmission bandwidth on the links between the access node(s) and the rest of the cellular communication network.

According to a further aspect of the invention, a method is provided for locally emulating a core network in a cellular communication network comprising a plurality of access nodes each covering a cell area and an access control node common to all access nodes for controlling the provision of traffic; the method comprising the step of:

classifying users of the cellular network into a first group of users and a second group of users, wherein said first group of users include users in a cell area or areas covered by a single access node or group of access nodes; and.

checking if a call or SMS is set up by a user belonging to the first or to the second group of users;

taking control over calls and/or SMSs set up between users belonging to the first group of users;

passing control to the access control node of the remaining calls and/or SMSs.

In a preferred embodiment, the method comprises the further step of:

detecting an outage in a link between at least one of the access nodes and the access control node, and enabling traffic between all users located in that cell area or areas covered by the single access node or group of access nodes.

Preferably, the method according to the invention is implemented by means of a computer program loaded to a network entity of the cellular communication network.

These and other aspects of the invention will be apparent from and elucidated with reference to the embodiments described hereinafter.

BRIEF DESCRIPTION OF THE DRAWINGS

The invention will be better understood and its numerous objects and advantages will become more apparent to those skilled in the art by reference to the following drawings, in conjunction with the accompanying specification, in which.

Throughout the figures like reference numerals refer to like elements.

DETAILED DESCRIPTION OF THE PRESENT INVENTION

Figure 3:
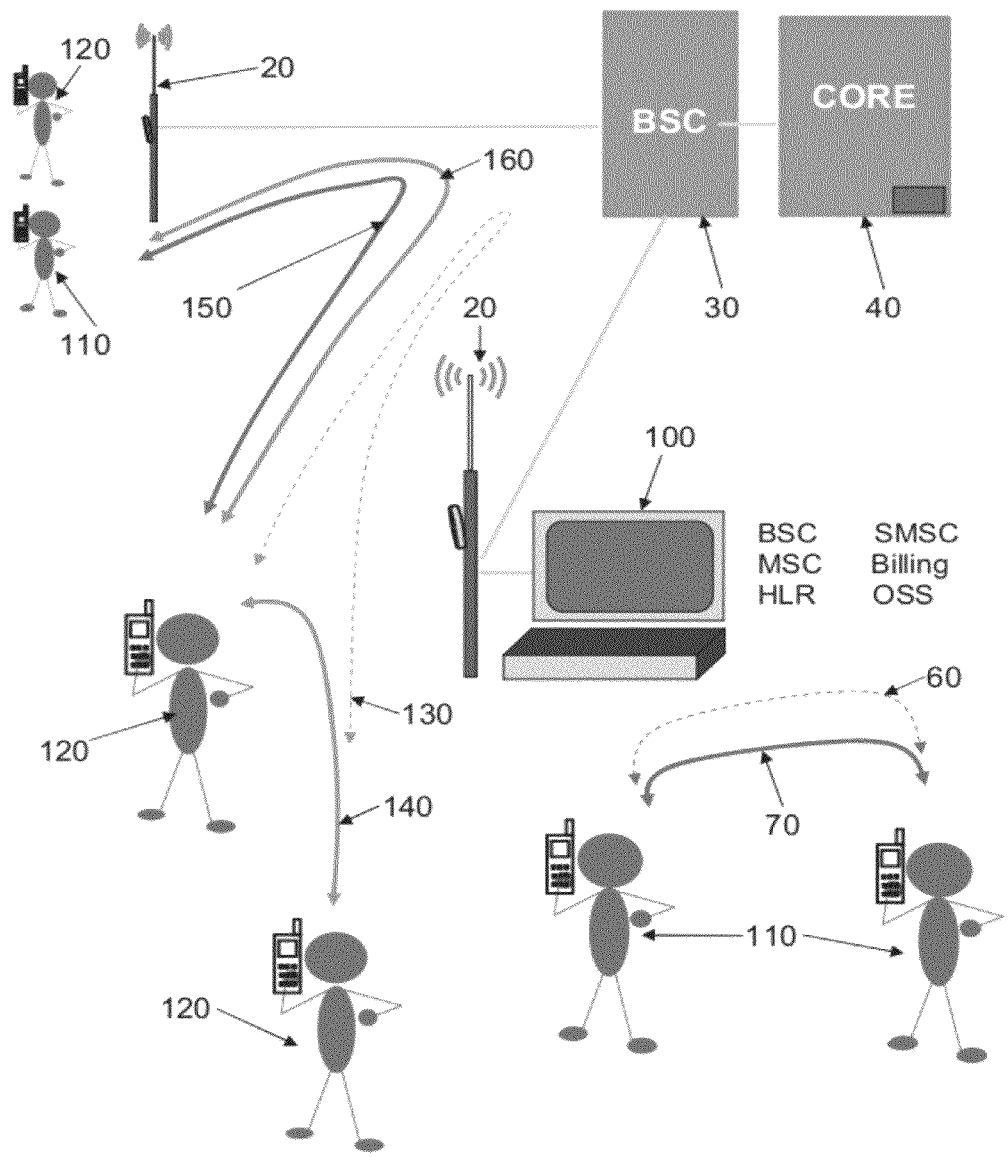
FIG. 3 shows the approach for providing local traffic and non-local traffic in a cellular communication network according to an embodiment of the present invention.

Referring now to FIG. 3 an embodiment of the invention is described. The embodiment is described with reference to a 2G cellular communication network and related voice calls and SMS messages. However, it should be understood that the skilled person can also implement the present invention for other types of technologies, e.g. in 3G cellular communication networks without any undue burden.

A 2G cellular communication network 10 is shown, which, as is usual, comprises a plurality of radio access nodes 20 (BTSs), one or more access control nodes 30 (BSC) (only one BSC is shown for clarity purposes) and a core network 40. The core network comprises the conventional network nodes and functionality of a 2G cellular communication network, such as MSC (Mobile Switching Centre), HLR (Home Location Register), VLR (Visiting Location Register), SMSC (Short Message Service Centre), the billing function, OSS (Operation Support System), etc. The functionality of the BSC 30 and the core network 40 together will be referred to as "central functionality" in this description. For one of the BTS 20 or a cluster of BTS's covering a specific local area, the functionality of the control node 30 and the most relevant functionalities of the core network, as listed, are implemented locally by means of a software executed on to a conventional computer 100 (e.g. a laptop) connected to the BTS(s) 20. This functionality will be referred to as "local functionality" in this description. So this conventional computer 100 is collapsing part of the functionalities traditionally supported by the BSC 30 and the core network 40. Alternatively, the local functionality can be integrated in the BTS itself.

According to the invention users are classed as either "local users" 110 or "public users" 120. Local users are provisioned in the local functionality and public users are provisioned in the central functionality.

In the case of a having a single BTS 20, the computer can be physically directly connected to the BTS 20 through, for instance, an Ethernet link. And then, the BTS to the control node 30. In the case of having a group or cluster of BTS's 20, the connection will depend on how these BTS's are interconnected; very likely, the BTS links are concentrated in a router, and the computer is also connected to this router. Then, from the router there is a link towards the control node.

A preferred embodiment to control the BTS/Node B makes use of CPRI ("Common Public Radio Interface"), which is an industry specification that standardises control functions for the radio base station on lower layers (layers 1 & 2 of the GSM OSI stack), and that enables the computer to make the BTS act accordingly to what it is defined in the invention. On top of this, the computer implements some proprietary software that translates actions for the BTS's in CPRI orders. For instance, in the case of a call between two local users and in the link up case:

During the call set up, both mobiles report their IMEI's.

These IMEIS's are captured by the computer that confirms that both users are local.

From that time onwards, the computer informs the corresponding BTS through CPRI commands that it takes care of call proceedings for this particular call.

For interaction purposes with the rest of the network elements (BSC, Core NW), the computer reuses the existing link between the BTS 20 or the group of BTS's and the BSC 30; and so, it might use the O&M link normally configured in Abis (2G) or Iub (3G) interfaces.

The control of the call provisioning to and the billing of local users are performed by the local functionality, as long as the users are in the camped area, which is the area covered by the access node or cluster of access nodes in which the local functionality is implemented. When a local user leaves his local area, he becomes a public user.

The local functionality follows 3GPP standards that apply (e.g. TS 44.XXX 3GPP specification series, signalling protocols) to control the call provisioning of local users.

The control of the call provisioning and the billing of public users are performed by the central functionality, in other words by the control node 30 and the core network 40 in the conventional way.

To differentiate between local users and public users IMSI-numbers may be assigned from different ranges and/or different pools of numbers.

Regarding security aspects, the local functionally supports common 3GPP standardised ciphering algorithms in the radio interface (e.g. A5/1, A5/3, etc.). In case of lawful interception needed, if the link between the local and central functionalities is available and operative, the central functionality will take this responsibility, regardless the type of user. In case of lawful interception of a local user, the local functionality will receive a particular local user interception order from the central functionality and will route all calls belonging to that local user through the central functionality. If there is an outage of the link between the local and the central functionalities, the local functionality implements capabilities to record and store all calls involving intercepted users; and when the link is operative again, it will provide this information to the operator.

Although the local functionality may implement some operation/configuration capabilities to change some parameters on the BTS or group of BTS's, the main operation responsibilities will belong to central functionality (e.g. OSS).

Figure 4:
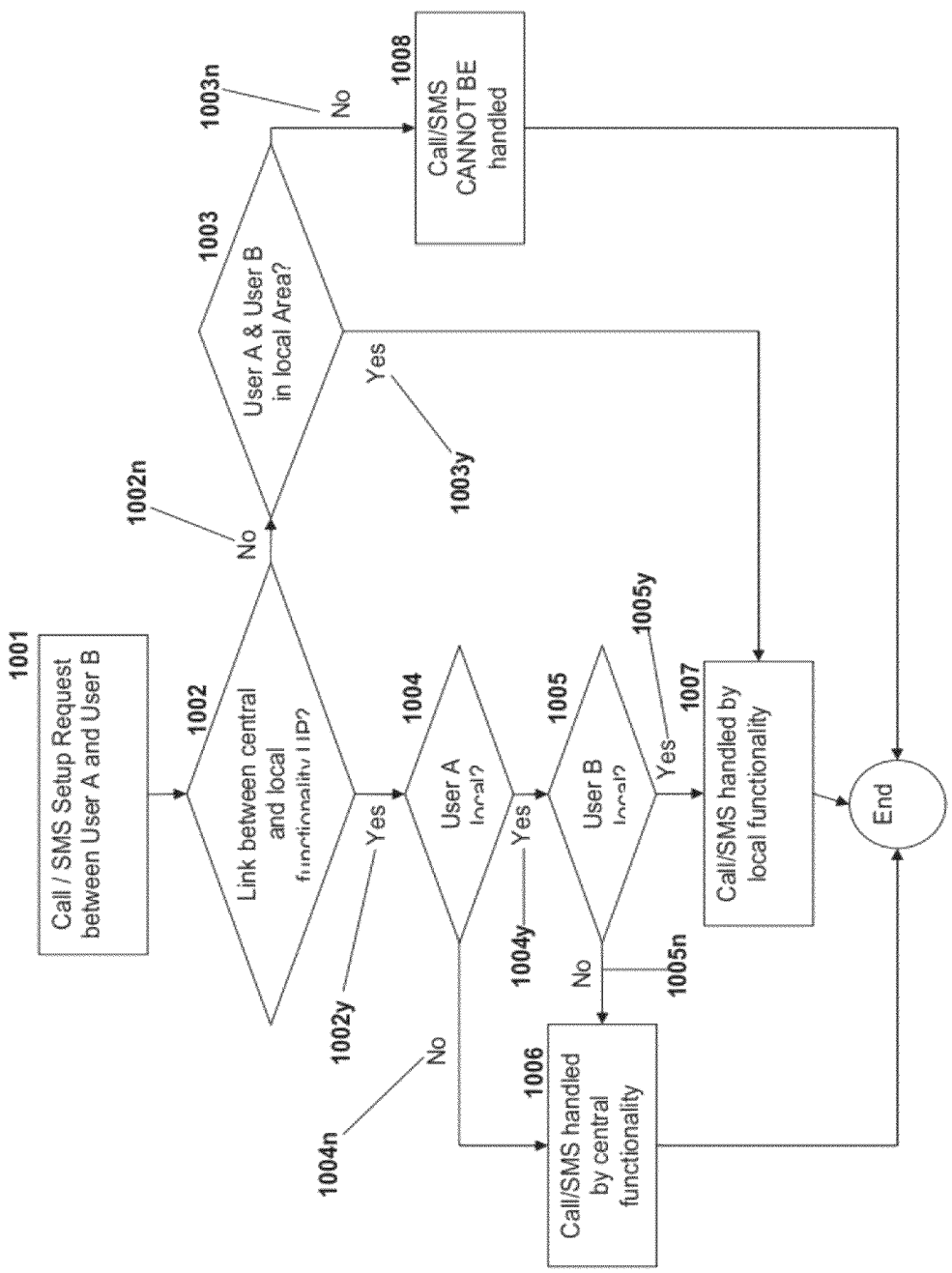
FIG. 4 shows a flow chart describing the call/SMS handling procedure according to the present invention.

As shown in FIG. 4, once the BTS 20 receives a call/SMS setup request between a User A and a User B (step 1001), the local functionality checks (step 1002) whether the link between local and central functionalities is available and operative. If this link is not working—due to, for example, some outage—(1002n), it is checked (1003) whether both users A and B are in the local area (area covered by the BTS's or group of BTS's which directly implement the invention or to which the computer 100 is connected). If so (1003y), the call/SMS is handled by the local functionality (1007), regardless of users being public or local users. Unless both users are in the local area (1003n), the call/SMS cannot be handled (1008).

If the link between the local and central functionalities is available and operative (1002y) and if both users A and B are defined as local users and provisioned by the local functionality (1004y & 1005y), the call is handled by the local functionality (1007). Otherwise, if any of the users is a public user (1004n; or 1004y & 1005n) the call/SMS is handled by the central functionality (1006).

So the local functionality monitors outgoing signalling messages originating from mobile users in the local coverage area. It filters the signalling messages from local users for local processing and passes on the rest to the control node 30. Consequently, the local functionality is transparent for public users.

In case of intercepting signalling originating from a local user 110 for setting up a call or SMS, from a local user, the local functionality deals with the control thereof and the billing of the call/SMS originated by the local user. First it is determined if the destination of the traffic is also a local user in the local area of the access node or cluster of access nodes by referring to the HLR implemented by the local functionality. If the destination is also a local user located in the local coverage area, this means that the generated traffic will be local traffic, i.e. traffic between users in the cell area or areas covered by the local access node or group of access nodes. In this case the local functionality executes a signalling procedure 60 with both local users. This results in a locally switched call/SMS 70 between them.

In case of a public user 120 setting up a call the local functionality will transparently pass on the corresponding signalling to the control node 30 of the network. Even if the call destination is another public user, who is also located in the local area the signalling 130 is routed to and from the control node 30 and the call control and the billing will be executed by the "central functionality" in the conventional way. However, the call 140 itself may be locally switched in the way as described with reference to the prior art solution shown in FIG. 1. Since, local switching is a widely known standard functionality, there is no need to describe it in more detail, here.

In case of a local user 110 calling a public user 120 located outside the local area of the local user, both the signalling and the call will be executed in the conventional way by the central functionality, as shown in the figure by double arrow 150. The local functionality implemented by means of the computer 100 is only involved for billing the local user.

In case of a public user 120 calling a public user 120 located in a different local area, both the signalling and the call will be executed in the conventional way by the central functionality, as shown in the figure by double arrow 160.

Figure 1:
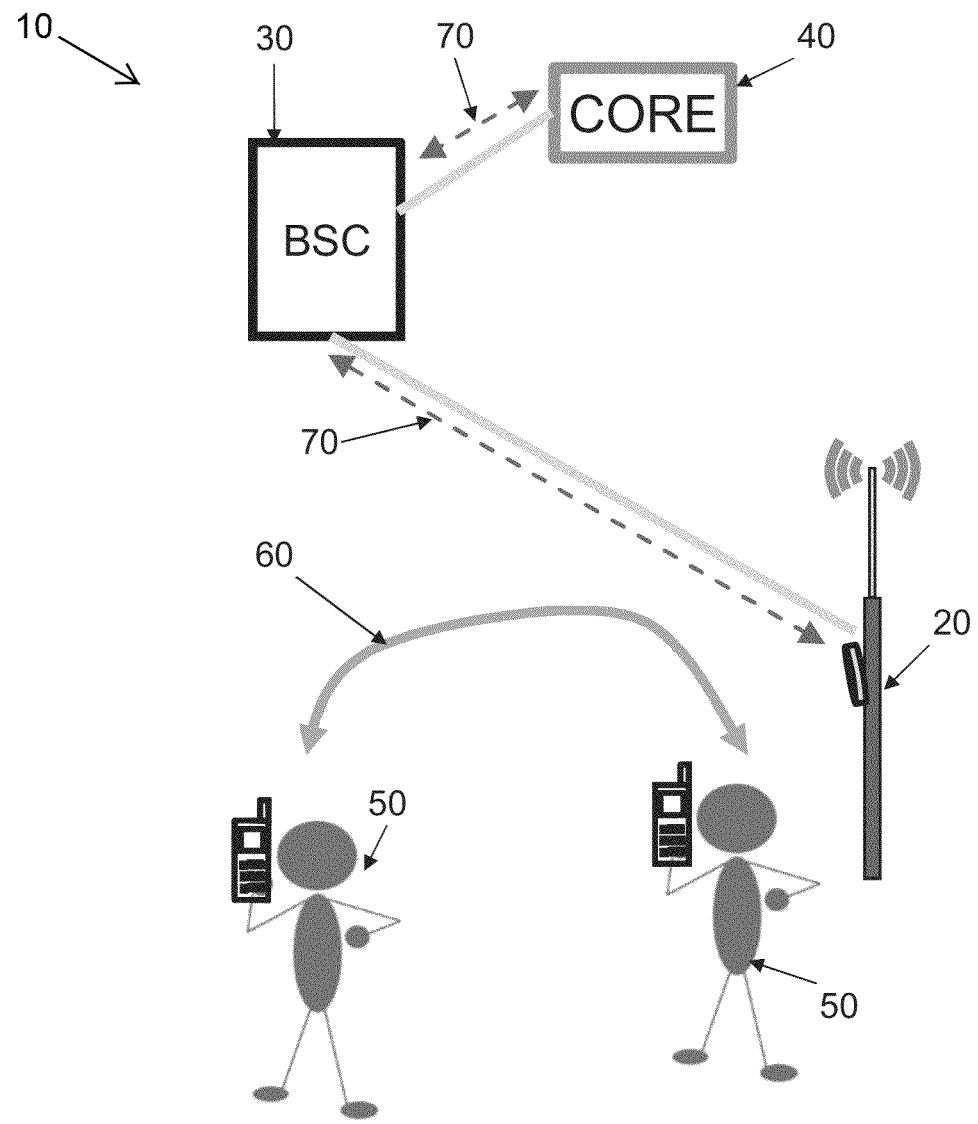
FIG. 1 shows a first approach for providing local traffic in a cellular communication network according to the prior art.
Figure 2:
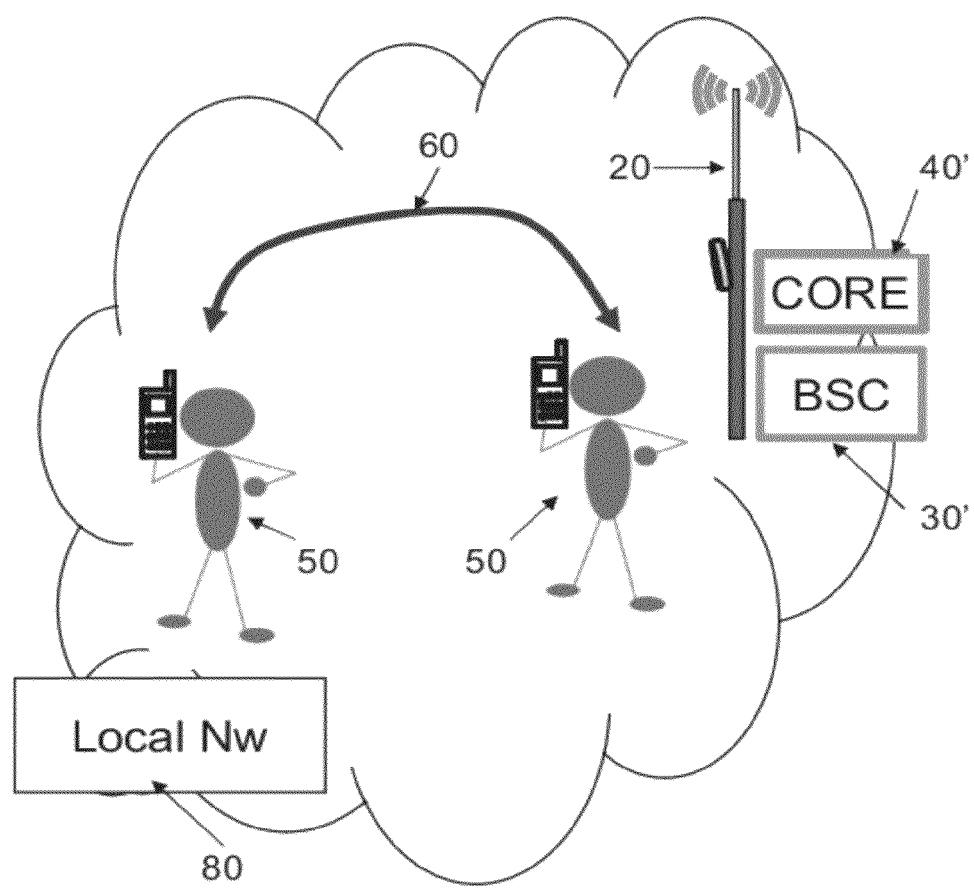
FIG. 2 shows a second approach for providing local traffic in a cellular communication network according to the prior art.

In case of an outage of the link between the local and central functionality, the local functionality still enables voice calls and SMS messages processing between all users located in the local area, regardless if they are local or public, providing further robustness compared to the prior art "local switching" functionality shown in FIG. 1.

During the takeover after an outage of the link between the local and central functionalities, calls between local users are not affected. However, calls that involve public users are probably dropped. During that process all users in the local coverage area are informed by SMS about the type of services that are available during the outage. Additionally, users can also be informed when the link is operative again.

Additionally, when there is an outage of the link, the local functionality assumes all operations of the local network. Any change or information collected during that time is afterwards synchronised with central functionality, when the link is operative again.

When a local user leaves his local coverage area, he becomes a public user. To this end, the IMSI of the user is stored in both the HLR of the local functionality and the HLR of the central functionality. Additionally, the Visitor Location Register (VLR) of the central functionality may have also local users' data thanks to a previous synchronisation process between the local functionality and central functionality.

So, when a local user is outside his local area, traffic control and billing thereof will be dealt with by the cellular communication network in the conventional way.

While the invention has been illustrated and described in detail in the drawings and foregoing description, such illustration and description are to be considered illustrative or exemplary and not restrictive; the invention is not limited to the disclosed embodiments.

Although, the invention has been described with reference to a 2G cellular communication network for voice calls and SMS messaging of course it may also be implemented in 3G cellular communication networks.

Other variations to the disclosed embodiments can be understood and effected by those skilled in the art in practising the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A network component of a cellular network, the cellular network comprising:
   a plurality of access nodes each covering a cell area; and
   an access control node common to all of the access nodes for controlling provision of traffic;
   wherein the network component comprises:
   a classifier for classifying users of the cellular network into a first group of users and a second group of users, wherein said first and second groups of users both include users in a cell area or areas covered by a single access node or group of access nodes; and
   a communication manager for:
      checking if a call or SMS is set up by a user belonging to the first or to the second group of users;
      taking control over calls and/or SMSs set up between users belonging to the first group of users when the users participating in the call and/or SMS are positioned in the cell area or areas covered by the single access node or group of access nodes; and
      passing control to the access control node of calls and/or SMSs:
         a) when at least one of the users participating in the call and/or SMS belongs to the second group and is positioned in the cell area or areas covered by the single access node or group of access nodes; and
         b) when at least one of the users participating in the call and/or SMS is not positioned in the cell area or areas covered by the single access node or group of access nodes,
   the network component being arranged in communication with said single access node or group of access nodes.

2. The network component according to claim 1, further comprising:
   monitoring means for detecting an outage in a link between at least one of the access nodes and the access control node,
   wherein the communication manager is configured to enable traffic between all users of the first and second groups of users located in the cell area or areas covered by the at least one access node when the monitoring means detects an outage in the link between the at least one access node and the access control node.

3. The network component according to claim 2, wherein said link is an Abis or an Iub interface.

4. A cellular communication network comprising:
   a plurality of access nodes each covering a cell area;
   an access control node common to all the access nodes for controlling a provision of traffic; and
   a network component as recited in claim 2.

5. The network component according to claim 1, wherein the network component is a computer.

6. The network component according to claim 1, wherein the communication manager is configured to bill users belonging to the first group of users.

7. A cellular communication network comprising:
a plurality of access nodes each covering a cell area;
an access control node common to all the access nodes for controlling a provision of traffic; and
a network component as recited in claim 1.

8. The cellular communication network according to claim 7, wherein a user of the first group of users becomes a user of the second group of users outside the cell area corresponding to the access node or group of access nodes.

9. A method for locally emulating a core network in a cellular communication network comprising a plurality of access nodes each covering a cell area and an access control node common to all of the access nodes for controlling the provision of traffic; the method comprising:
classifying users of the cellular network into a first group of users and a second group of users, wherein said first and second groups of users both include users in a cell area or areas covered by a single access node or group of access nodes; and
checking if a call or SMS is set up by a user belonging to the first or to the second group of users;
taking control over calls and/or SMSs set up between users belonging to the first group of users when the users participating in the call and/or SMS are positioned in the cell area or areas covered by the single access node or group of access nodes; and
passing control to the access control node of calls and/or SMSs SMSs:
  a) when at least one of the users participating in the call and/or SMS belongs to the second group and is positioned in the cell area or areas covered by the single access node or group of access nodes; or
  b) when at least one of the users participating in the call and/or SMS is not positioned in the cell area or areas covered by the single access node or group of access nodes.

10. The method according to claim 9, further comprising:
detecting an outage in a link between at least one of the access nodes and the access control node, and
as a result of the outage, enabling traffic between all users of the first and second groups of users located in that the cell area or areas covered by the at least one access node.

11. The method according to claim 9, wherein a user of the first group of users becomes a user of the second group of users outside the cell area of their access node or group of access nodes.

12. A network entity of a cellular communication network, the network entity comprising a computer device that is configured to perform the method recited in claim 9.

13. A computer program product incorporating computer program code adapted to perform the steps of the method according to claim 9 when said program code is executed on a computer, a digital signal processor, a field-programmable gate array, an application-specific integrated circuit, a microprocessor, a micro-controller, or any other form of programmable hardware.

14. A cellular communication network having a plurality of cell areas, the cellular communication network comprising:
a core network;
a plurality of access nodes each covering one of the cell areas;
an access control node that controls the provision of traffic between the core network and the plurality of access nodes; and
a network component communicable with an access node corresponding to one of the cell areas, the network component comprising:
  a classifier operable to classify users positioned within the cell area as local users or public users; and
  a communication manager operable to manage communications that involve users within the cell area, the communications being managed such that:
    communications between local users positioned within the cell area occur without passing the communications through the access control node, the network component implementing local functionality of a core network and an access control node to enable the communications,
    communications to or from public users positioned within the cell area are passed to the access control node, and
    communications to or from users not positioned within the cell area are passed to the access control node.

15. The cellular communication network recited in claim 14, wherein the communications are further managed by the communication manager such that:
communications corresponding to the cell area are passed to the access control node only when a link exists between the access node corresponding to the cell area and the access control node, and
when an outage is detected in the link between the access node corresponding to the cell area and the access control node, communications between all users positioned within the cell area occur without passing the communications through the access control node, the network component implementing local functionality of a core network and an access control node to enable the communications.

* * * * *